Nov. 24, 1970  J. DRUMMOND ET AL  3,541,861
PIPE-LINE SAMPLING APPARATUS
Filed March 6, 1968  2 Sheets-Sheet 1
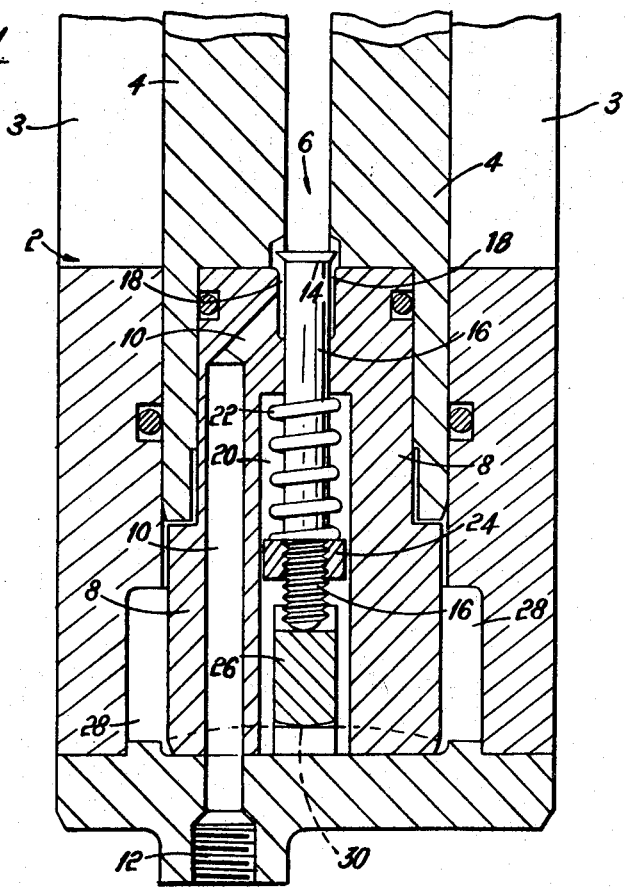
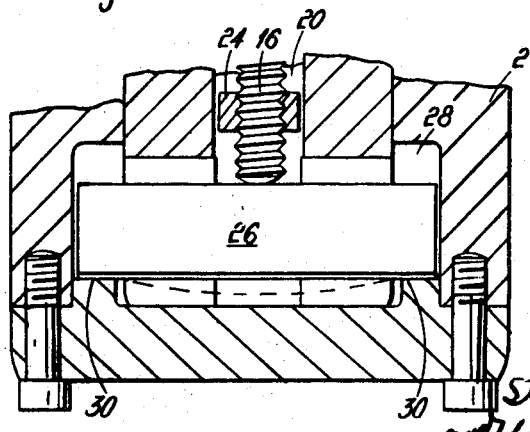

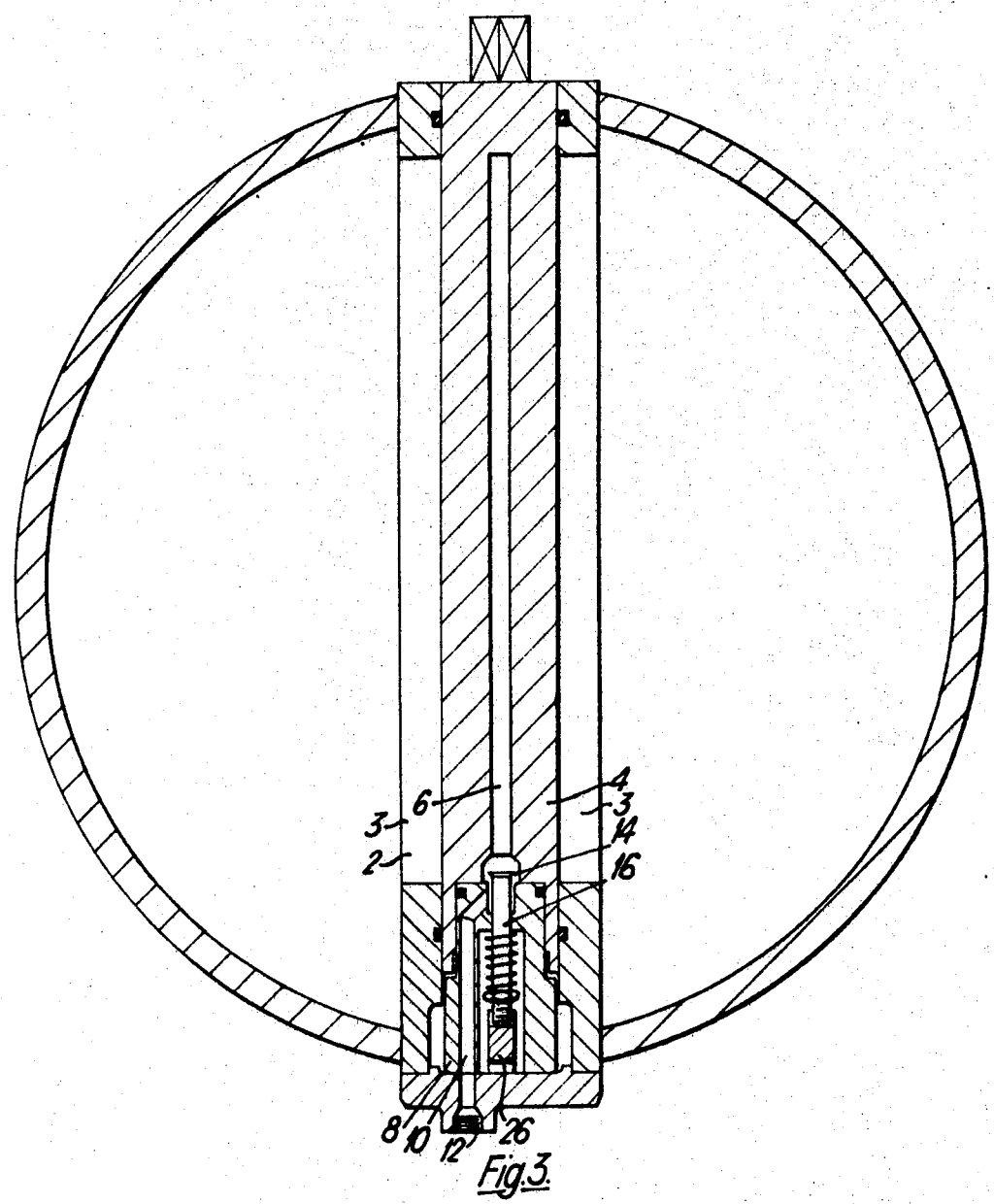

United States Patent Office 3,541,861
Patented Nov. 24, 1970

3,541,861
PIPE-LINE SAMPLING APPARATUS
John Drummond, Thatcham, and Stamford Robert Francis Vanderstegen-Drake, Newbury, England, assignors to Plenty & Son Limited, Newbury, Berkshire, England, a British company
Filed Mar. 6, 1968, Ser. No. 710,819
Claims priority, application Great Britain, Mar. 8, 1967, 10,998/67
Int. Cl. G01n 1/20
U.S. Cl. 73—422     1 Claim

ABSTRACT OF THE DISCLOSURE

The pipe line sampler has a cylindrical bushing which is adapted to extend across a line section and which has two diametrically opposed slots in its wall to provide a liquid passage in alignment with the direction of flow through the pipe line. A plug is rotatably mounted in the bushing and has a slot which can be aligned with the slots in the wall of the bushing during free flow of the liquid. The plug is movable to a position in which the slots thereof are out of alignment with the slots in the bushing and communicate with an outlet passage through which the liquid, trapped in the slot in the plug, flows to a sample container or the like. A valve is located between the sample slot in the plug and the outlet to the container. Means are provided to open the valve either as a result of movement of the plug to the sampling position, or timed so as to operate in sequence with the means for turning the plug.

---

This invention relates to apparatus for drawing samples of liquid from a pipe line. It is particularly concerned with the general type of such apparatus described in British Pat. specification No. 883,582.

The pipe line sampler described in that specification comprises a cylindrical bushing which extends across a line section and which has two diametrically opposed slots in its wall to provide a liquid passage in alignment with the direction of flow through the pipe line and a plug which is rotatably mounted in the bushing and provided with a slot which can be aligned with the slots in the wall of the bushing as will be the case during free flow of the liquid. When it is desired to take a sample of the liquid the plug is turned so that its slot is out of alignment with the slots in the bushing and communicates with an outlet passage through which the liquid, trapped in the slot in the plug, flows to a sample container or the like.

It has been found that a pipe-line sampler of this type suffers from the disadvantage that the outlet passage is permanently open to the sample container and so there is a danger of leakage between the plug and the bushing. This is unacceptable as the samples taken have to be very accurate and consequently it has hitherto been necessary to lap the plug and cylindrical bushing both separately and together so that an extremely fine and tight fit is obtained. This solution does eliminate leakage but has to be done by a highly skilled man and may take several days. This is not a commercial proposition and further such a tight fit between the plug and bushing gives rise to a risk of seizure.

This problem is solved in accordance with this invention by the provision of a value located between the sample slot in the plug and the outlet to the container and preferably located as close to the sample slot as possible so as to avoid the risk of a false liquid analysis caused by liquid seeping into the portion of the outlet passage between the slot and the valve. Means are provided to open the valve either as a result of movement of the plug to the sampling position or timed so as to operate in sequence with the means for turning the plug.

With the use of such a valve it has been found that the fit between the plug and bushing can be a normal commercial fit since as the period used to eject the sample from the slot is short especially if the sample is ejected from the slot by compressed air, any seepage into the slot during discharge is too small to be important and at all other times the valve prevents seepage into the sample container.

The valve may be of any standard type and arranged in any desired way. One example of valve arrangement will now be described with reference to the accompanying drawing in which:

FIG. 1 is a section through the base of a pipe-line sampler of the general type described in specification No. 883,582;

FIG. 2 is a corresponding view taken at right angles to FIG. 1; and

FIG. 3 is a schematic cross-section of the pipeline sample of FIG. 1 installed in a pipeline.

The sampler comprises a cylindrical bushing 2 which in use will be mounted across a rectangular housing (not shown) in a pipeline. The wall of the bushing is formed with two diametrically opposed slots 3 aligned with the direction of flow of liquid through the pipeline. A solid plug 4 is rotatably mounted in the cylinder with a fine sliding fit and the plug is formed with a sample slot 6 passing through it. Normally the slot 6 is aligned with the slots in the wall of the bushing 2 so that liquid flows through the sampler but when it is desired to take a sample means (not shown) either manually operated or operated in accordance with the setting of a flow meter or the like, come into operation to turn the plug through 90° to the position shown in FIG. 1.

The plug is supported at its lower end on a cylindrical block 8 rotatably mounted within the cylinder and formed with an outlet passage 10 its lower end communicating during ejection of a sample with an outlet 12 in the base of the bushing leading in use to a sample container or the like, and its upper end communicating with the lower end of the sample slot 6.

A poppet valve 14 is located between the sample slot and the passage 10 with its head flush with the bottom of the slot so that no liquid can lie stagnant above it. The spindle 16 of the valve extends through an enlarged portion 18 of the outlet passage into a spring chamber 20 within the block 8. A strong spring 22 is positioned within the chamber extending between the top of the spring chamber and a nut 24 on the valve spindle to bias the valve to the closed position (not shown in the drawing).

The lower end of the spindle rests on a lifting bar 26 extending across the base of the block 8 and into a recess 28 in the base of the bushing into which lifting cams 30 project. As the plug is turned through 90° from the normal position to the sampling position as seen in the drawing, the bar 26 is lifted by the cams 30 at each side thus lifting the valve spindle and valve allowing the contents of the slot 6 to be ejected, by compressed air or by gravity, down the passage 10 and through the outlet 12. As the slot 6 is no longer in line with the slots in the bushing only the known quantity of liquid in the slot is removed from the pipe line for sampling tests.

When the plug is turned back to its normal position (90° from that shown in the drawing) the bar 26 is moved from the raised portions of the cams so that the spring 22 moves the valve back onto its seat to prevent any liquid which may seep from the slot between the plug and cylinder to enter the outlet passage where it would spoil the sampling procedure.

We claim:
1. A pipe line sampler comprising a cylindrical bushing adapted to extend across a pipe line section, said bushing having diametrically opposed slots in its wall in alignment with the direction of flow through the pipe line; a plug rotatably mounted in said bushing and provided with a slot which can be aligned with the slots in the wall of the bushing in one position and can be disaligned in another position, said plug having an offset outlet passage adapted to communicate with a sample container, said passage communicating with the slot and receiving the liquid which is trapped in the slot; an axially disposed valve located between the slot and the outlet passage, said valve having a spindle extending through an enlarged portion of the outlet passage and into a chamber at the lower end of the plug; means in said chamber for normally biasing the valve into closed position; a vertically movable lifting block in said chamber extending across the lower end of the cylindrical bushing and into a recess therein, the lower end of the spindle engaging said block, and cam surfaces in said recess engaging the ends of the lifting block whereby the block and spindle will be raised as the plug is rotated to sampling position.

References Cited
UNITED STATES PATENTS

| | | | |
|---|---|---|---|
| 2,558,387 | 6/1951 | Ray | 73—422 |
| 3,031,890 | 4/1962 | Struck. | |
| 3,034,359 | 5/1962 | Shaw. | |

LOUIS R. PRINCE, Primary Examiner

H. C. POST III, Assistant Examiner

U.S. Cl. X.R.

73—424